L. A. BROWN.
THERMOMETER HOLDER FOR INCUBATORS.
APPLICATION FILED MAR. 23, 1916.
1,225,570.
Patented May 8, 1917.
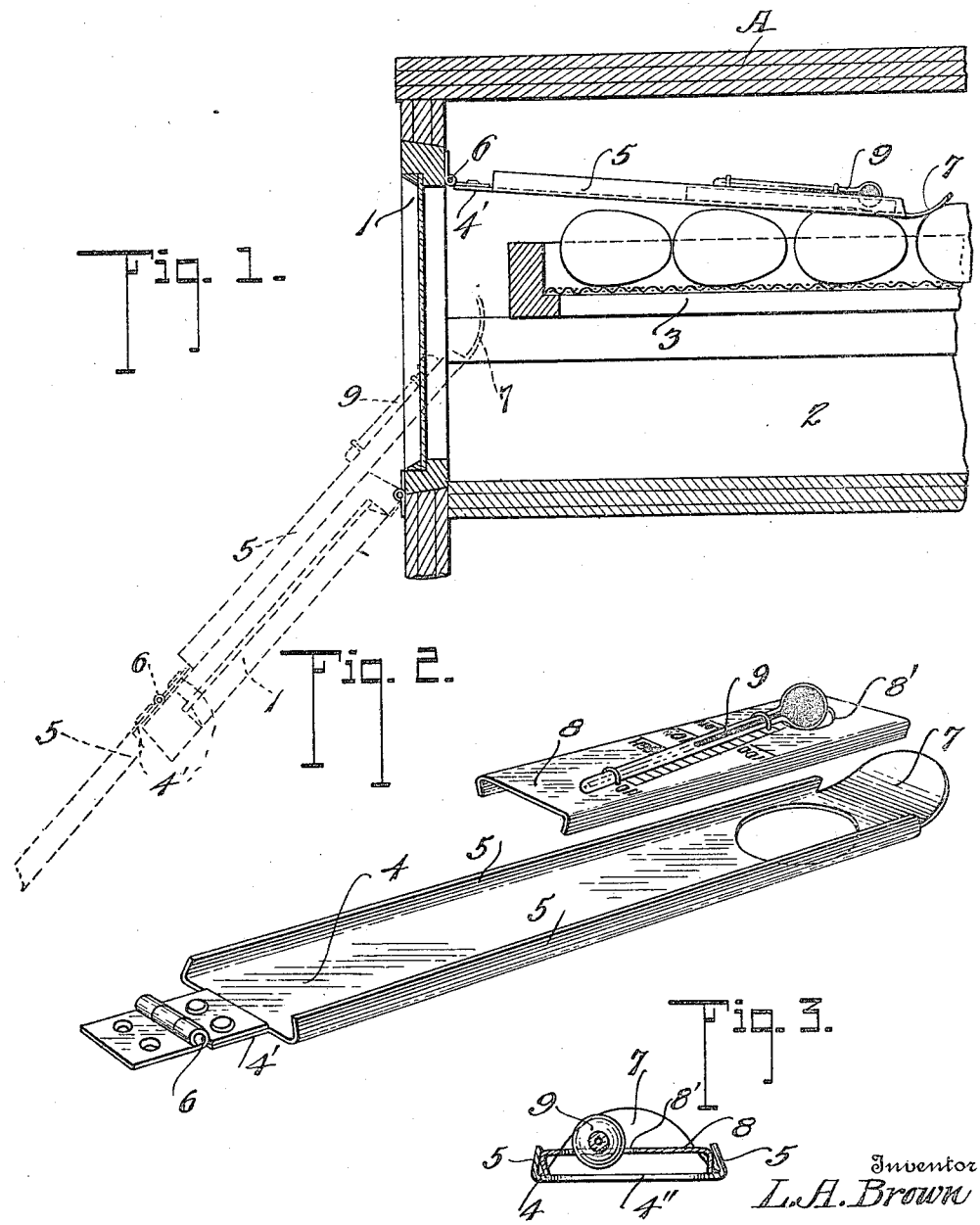
Inventor
L. A. Brown
Witness
C. H. Wagner
By
Robb & Robb
Attorneys

UNITED STATES PATENT OFFICE.

LUCIUS A. BROWN, OF CLAY CENTER, NEBRASKA, ASSIGNOR TO THE M. M. JOHNSON CO., OF CLAY CENTER, NEBRASKA.

THERMOMETER-HOLDER FOR INCUBATORS.

1,225,570.   Specification of Letters Patent.   Patented May 8, 1917.

Application filed March 23, 1916. Serial No. 86,211.

*To all whom it may concern:*

Be it known that I, LUCIUS A. BROWN, a citizen of the United States, residing at Clay Center, in the county of Clay and State of Nebraska, have invented certain new and useful Improvements in Thermometer-Holders for Incubators, of which the following is a specification.

In the operation of mechanical incubating apparatus for the artificial hatching of eggs, experience has proved that the proper control of the temperature of the incubation chamber is an all important requirement for success. In addition therefore to employing effective automatic regulators for the above purpose, it is customary to utilize reliable and accurate means such as a thermometer to advise of the state of the temperature in the egg chamber of an incubator.

No small difficulty has heretofore been met with in respect to what may seem the simple use of thermometers in incubating compartments, on account of the need of locating the instrument as close to the eggs as practicable. When so disposed the instrument is often knocked down, or otherwise displaced, by the chicks, making it impossible for the time being to determine the true temperature at the egg tray. The plan of merely placing the thermometer in the egg chamber on the eggs as frequently relied upon, offers such obvious disadvantages in respect to dislocation of the instrument and difficulty of finding to consult its indications as to require no elucidation. The devices which have been proposed to support the thermometer in the incubating chamber also offer such disadvantages in failing to so position the instrument as to get the exact temperature of the eggs, etc., as to make them undesirable for essential reasons.

In the practical embodiment of this invention the object has been to devise means for holding a temperature indicating instrument for incubator usage, having the following essential and characteristic features:—

First—The holding means is applicable to practically all incubators and for use in connection with all incubator thermometers in general use today.

Second—The holder is designed to support the thermometer directly upon and in contact with the eggs at all times, the only dependable mode of determining the actual temperature of the eggs.

Third—The holder is adapted to maintain the thermometer in the same position in relation to the egg tray at all times.

Fourth—The thermometer is so mounted in respect to the holder that the instrument will be drawn out of the incubation chamber automatically each time the door is opened to thereby conveniently and immediately advise the operator regarding the temperature of the eggs.

Fifth—With the use of the present invention it does not become necessary to hunt around in the dark interior of the incubating machine in order to find the thermometer, whereby a variation of several degrees of temperature in the incubating chamber may take place before the instrument can be consulted.

Sixth—It is impracticable in the use of the holding means of this invention for the chicks at hatching time to move the thermometer, this being of great importance, so much so that the expedient of supporting the thermometer above the eggs to keep them from dislocating it has been resorted to, making it impossible to determine the true temperature of the eggs for reasons previously referred to.

Seventh—The holding means of the invention maintains the thermometer at the egg level at all times, while the door of the egg compartment is closed, properly returning it to such position incident to the closing of the said door after opening.

Eighth—The holding means makes provision for the ready detachment and replacement of the thermometer carried thereby, an especial convenience in event of accidental breakage of the temperature indicator.

Ninth—The holding means is so mounted in connection with the door to the egg compartment that said means may be folded back out of the way so that it will not interfere with the ready removal of the egg tray for purposes of turning the eggs disposed therein.

In addition to the foregoing advantageous features of construction, the thermometer holding means of the invention has been devised especially with a view to simplicity and cheapness as an article of manufacture, and possesses other advantages in regard to detail formation of parts which will be more fully evident upon reference to the aftergoing description and in connection with the accompanying drawings, in which—

Figure 1 is a sectional view of a portion of an incubator showing the invention in operative position therein, the dotted lines illustrating the door of the incubating compartment in opened position and the thermometer holding means arranged for the consultation of the thermometer, and also arranged in outfolded position wherein it will be disposed for facilitating the removal of the egg tray.

Fig. 2 is a combined view illustrating the holder attachment and the thermometer spaced therefrom.

Fig. 3 is a cross sectional view illustrating the arrangement of the thermometer when disposed in operative position in the holder.

Specifically describing the invention, A denotes an incubator of any conventional construction, the same being provided with the customarily employed door 1 whereby access may be had to the incubation compartment 2 in which the eggs are disposed upon the usual tray 3. The tray 3 is, of course, readily removable for purposes of properly placing the eggs thereon and to facilitate the turning of the eggs regularly performed at certain intervals.

This invention comprises the thermometer holder 4 consisting of a plate formed with inwardly turned side edge flanges 5 extending nearly throughout its entire length. At one end the plate 4 has an extension 4' to which is secured a hinge 6 adapted also to be attached to the upper portion of the door 1 as seen in Fig. 1. Adjacent to its opposite end the plate 4 is provided with a comparatively large aperture 4'' and the extremity of the plate near the aperture 4'' is extended so as to form a tongue or runner 7. The thermometer 8 is supplied with the usual mercury tube 9 and may be of any conventional type, generally speaking. The body of the thermometer, however, is susceptible of being engaged between the flanges 5 of the plate 4 of the holder and thereby held in proper position on the holder. The body of the thermometer is likewise apertured at the base of the mercury tube as seen at 8', and said aperture will be located opposite the aperture 4'' of the holder 4 when the parts 4 and 8 are in proper relative positions. The object of the foregoing arrangement is to enable the lower end of the mercury tube 9 to rest in substantially direct contact with an egg disposed upon the trays 3, for it is by this construction, arrangement and action that it is possible to determine with exactitude the temperature of the eggs in the incubating chamber.

The thermometer 8 is adapted to be positioned on the holder 4 by bending the flexible tongues or runner 7 into alinement with the body of the plate 4 and slipping the thermometer endwise into the space between the flanges 5, after which the tongue 7 may be bent into its proper curvature which is essential for reasons hereinafter specified.

In the actual use of the invention it will be apparent upon reference to Fig. 1 that when the operator opens the door 1 the holder 4 supported at one end from the door and at the other end upon an egg or eggs, will move outward with the door to assume the position shown by the inner set of dotted lines in Fig. 1. Such position will of course be assumed simultaneously with the opening of the door and thereafter the operator is permitted to readily read the thermometer indications for the customary purposes and may determine with certainty the exact temperature of the eggs in the process of incubation. Should it be desired to remove the tray 3 it will be seen that the holder 4 may fold outward and downward until it rests in a substantially parallel position in respect to the door 1, out of the way of the tray and, indeed, with the mercury tube inward in a position in which it is not liable to be broken and the thermometer thus incapacitated.

The provision of the runner or tongue 7 of the holder 4 is essential in that by its use the inner end of the holder is adapted as soon as it contacts with the eggs to slide or skid over the latter until the door 1 has been moved from its open to its closed position.

The body of the thermometer 8 may be conveniently made of metal with edge flanges adapted to engage and interlock after a manner with the corresponding flanges 5 of the holder 4, as will be seen best upon reference to Fig. 3 of the drawings.

It is contemplated within the purview of the present invention that the specific form of the holding means as hereinbefore set forth may be modified considerably since it is not essential in respect to certain phases of the mounting and operation of the holding means in relation to the door. I wish it to be understood, therefore, that I do not desire to be confined to the mere details of construction of my invention as hereinbefore presented since I believe it to be broadly new to utilize thermometer holding means operable by a movable member in the manner set forth. I also believe it to be broadly new to construct the holding means for movement over the eggs in the manner hereinbefore set forth, as well as to obtain an arrangement of the said means permitting it to be thrown into an entirely inactive position protecting the thermometer and facilitating the removal and replacement of the egg tray without interference in this particular connection.

Having thus described the invention, what is claimed as new is:—

1. The combination, with an incubator comprising an incubating compartment and a door whereby access may be had thereto, of a thermometer holder disposed in the incubator and loosely connected at one end with the door whereby it will move freely into and from said chamber upon closing and opening the door, the other end of said holder being formed so as to act as a runner so that it may freely skid over eggs in the incubator chamber, and a thermometer mounted on said holder.

2. The combination, with an incubator comprising an incubating compartment and a door whereby access may be had thereto, of a thermometer holder disposed in the incubator and loosely connected at one end with the door whereby it will move freely into and from said chamber upon closing and opening the door, the other end of said holder being upturned after the manner of a runner whereby to facilitate the movement of this portion of the holder over eggs in the incubator chamber and while engaged with said eggs, and a thermometer supported by said holder, the holder being provided with an opening to permit said thermometer to rest in direct contact with an egg in the incubator chamber.

3. The combination, with an incubator comprising an incubating compartment and a door whereby access may be had thereto, of a thermometer holder disposed in the incubating compartment, a thermometer on said holder for registering the temperature of the eggs in the compartment when the door is in closed position, and a connection between the holder and the door whereby on opening of the door the holder moves outwardly therewith and also has movement independent thereof so as to facilitate reading of the thermometer, said connection being such as to afford additional movement of the holder independently of its movement by the door to carry the holder and thermometer into a position to avoid liability of breakage of the same.

4. The combination, with an incubator comprising the usual incubating compartment and a door whereby access may be had thereto, of thermometer holding means connected with said door and adapted to be moved by the closing and opening of the door into indicating relation in respect to eggs in the incubating compartment and into a position facilitating the reading of a thermometer carried thereby, the said holding means being provided with a runner to facilitate movement of the same over and in contact with eggs in the incubating compartment.

5. The combination, with an incubator comprising the usual incubating compartment and a door whereby access may be had thereto, of a thermometer holder, means movably connecting one end of said holder with the door whereby the holder may be moved into and out of the incubator upon closing and opening the door to assume positions facilitating temperature registering and reading of a thermometer carried thereon, and a thermometer supported on said holder, said holder being formed at its other end with a runner to facilitate engagement and movement of said holder in contact with eggs in the incubating chamber.

6. The combination, with an incubator comprising an incubating compartment and a door whereby access may be had thereto, of a thermometer holder disposed in the incubator, a thermometer on said holder being normally held by the holder in a position to register the temperature of eggs in said compartment, means pivotally connecting the door and said holder whereby as the door is opened the holder will freely swing so as to assume a position supported by the door but in which the holder is moved outwardly from the compartment to facilitate reading of the thermometer therein, the said pivotal means being such as to admit of additional pivotal movement of the holder after its outward movement above referred to so that the holder may be turned on the door while the latter is open to carry the thermometer into an out-of-way position.

In testimony whereof I affix my signature.

LUCIUS A. BROWN.

Copies of this patent may be obtained for five cents each, by addressing the "Commissioner of Patents, Washington, D. C."